Aug. 25, 1936.  C. L. DAUN  2,052,280
LUBRICATOR
Filed Dec. 13, 1933
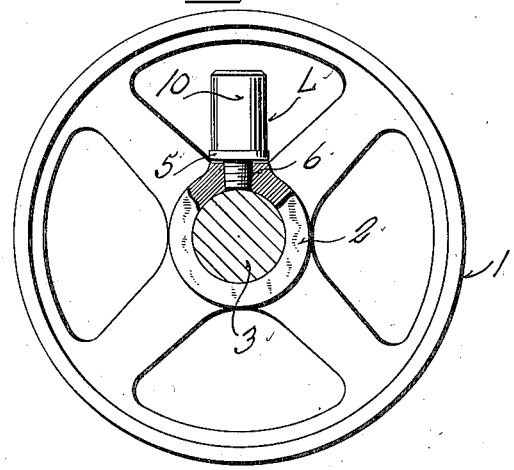
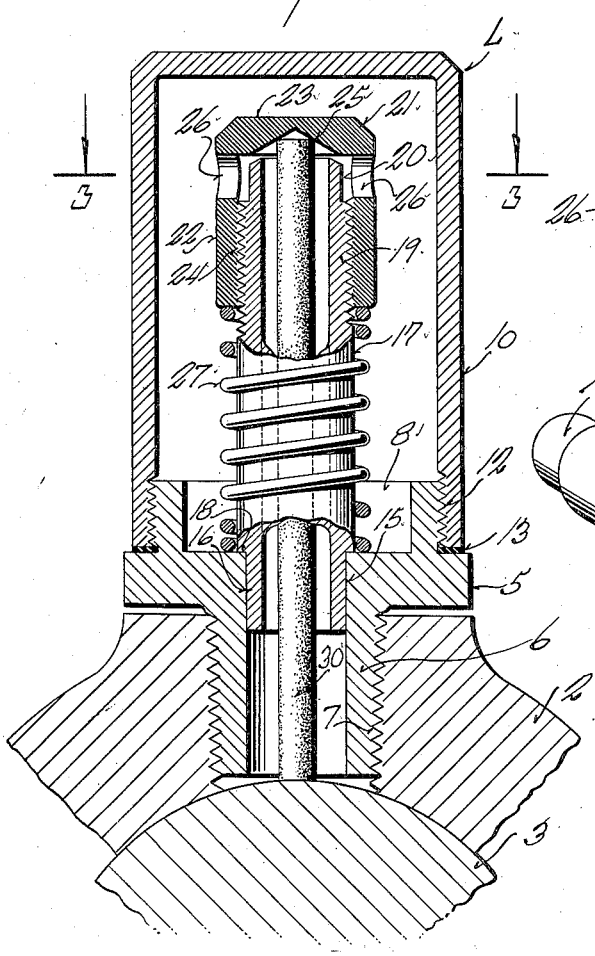
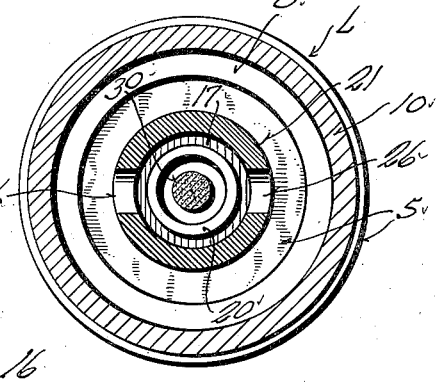
INVENTOR.
Carl L. Daun Patented Aug. 25, 1936

2,052,280

UNITED STATES PATENT OFFICE 2,052,280

LUBRICATOR

Carl L. Daun, Milwaukee, Wis., assignor, by direct and mesne assignments, of one-half to William F. Daun, Saginaw, Mich., and one-half to L. Roy Smith and Minta A. Smith, Wauwatosa, Wis.

Application December 13, 1933, Serial No. 702,186

6 Claims. (Cl. 184—64)

This invention relates in general to lubricators and more particularly to lubricators especially designed and adapted for use on loose pulleys or equivalent instrumentalities operating in a similar manner and under similar conditions.

One of the principal objects of the present invention is to provide a lubricator of this character which is simple and compact in its construction and yet insures the feed of just the proper or required amount of lubricant to the bearing surfaces of the pulley, thereby increasing the efficiency of the lubrication and realizing substantial economy in the use of the lubricant.

A further object is to provide a lubricator having these advantages and capacities and which is capable of easy and exact adjustment to meet the requirements of any particular situation within the range of usefulness of the lubricator and which is so constructed and organized as to maintain its adjustment and to tend to prevent meddlesome tampering therewith.

Other objects and advantages reside in certain novel features of the construction, arrangement and combination of parts which will be hereinafter more fully described and particularly pointed out in the appended claims, reference being had to the accompanying drawing, forming a part of this specification, and in which:

Figure 1 is a view partly in elevation and partly in section showing one way of combining a lubricator embodying the present invention with a loose pulley;

Figure 2 is a fragmentary view partly in diametrical vertical section and partly in elevation and illustrating the details of the construction of the embodiment of the invention shown;

Figure 3 is a view in transverse section taken on line 3—3 of Figure 2; and

Figure 4 is a detail perspective view of the valve tube of the lubricator.

Referring to the drawing, the numeral 1 designates a loose pulley, the hub 2 of which is rotatable on the shaft 3. The lubricator embodying the present invention is designated at L.

As illustrated, the lubricator comprises a body 5 having an outlet fitting or externally threaded nipple 6 which is threaded into an internally threaded opening 7 extending radially through or transversely of the hub of the pulley between the spokes thereof. The body 5 is provided on the side thereof opposite the nipple 6 with an externally threaded upstanding annular flange 8 which is inset inwardly from the periphery of the body 5. A container 10 is provided for the lubricant and preferably is in the form of a cylinder having its outer end closed and having its inner end open and internally threaded so as to be adapted for interconnection with the external threads of the flange 8 in the manner illustrated in Figure 2. A gasket 13 is interposed between the lower end of the body portion of the container 10 and that part of the body 5 lying outside of the upstanding flange 8 to seal the structure and preclude escape of lubricant.

A central opening 15 is provided in the body 5 and forms a continuation of the opening or bore of the nipple 6. The lower end portion 16 of a valve tube designated generally at 17 is fitted in the opening 15. It will be noted that the end portion 16 is of a somewhat reduced outside diameter so that a shoulder 18 is provided which abuts the portion of the body 5 around the margin of the opening 15. The valve tube may be secured to the body in any suitable way. Usually it is sweated into the body. With the valve tube so connected to the body it extends up into the interior of the container 10 to a point adjacent the outer closed end thereof and in the arrangement shown is disposed radially with respect to the pulley, that is, with its axis co-incident with the axis of the container and the body.

The periphery of the tube 17 adjacent its upper end is externally threaded as at 19 and beyond said threaded portion is provided with a reduced extension 20. A valve cap 21 is provided and includes a cylindrical body portion 22 and an end or head plate 23. Internally the body portion 22 of the cap 21 is threaded as indicated at 24, the threads 24 being interengaged or interthreaded with the threads 19 in the assembly. The underside of the head or end plate 23 of the cap is formed with a conical recess or indentation 25. At the juncture of the body portion and head, the body portion 22 is formed with one or more transversely or radially extending ports 26.

By turning the cap 21 in one direction or the other with respect to the valve tube 17 it is either moved down onto the tube or upwardly thereof so as to bring the extension 20 into more or less complete overlapping relation with respect to the ports 26 and to bring the upper beveled edge thereof closer to or further away from the beveled wall of the recess 25 which has the effect of regulating the flow of lubricant from the container 10 into the valve tube 17. Of course, the adjustments of the cap are effected with the container 10 disassembled. Any selected adjustment of the cap relative to its valve tube is maintained by virtue of the provision of a spring 27 which encircles the valve tube, has its lower end abutting against the body 5 and has its upper end pressing against the lower end of the body portion 22 of the valve cap 21. The arrangement is such that the spring 27 is under compression in all positions of the valve cap and under such substantial compression as to releasably secure the valve cap against accidental displacement.

The passage of the oil through the valve tube to the bearing may be facilitated by the provision of a suitable wick 30 which extends through the valve tube and to the bearing.

In use, the cap 21 may be adjusted to so exactly control the flow of oil from the container 10 into the valve tube as to satisfy exactly the lubricating requirements of the bearing and the control over this flow is so positive as to preclude centrifugal force from materially varying the rate of feed. Not only is positive control of the rate of feed had but this rate of feed is variable as required. The container 10 may be readily charged with lubricant and readily assembled with the body 5 without spilling the lubricant, it being necessary merely to turn the loose pulley 180° from the position shown in Figure 1 to effect such assembly. While possessed of these advantages, the device is extremely simple and compact in its construction, is capable of economic production and convenient installation and is highly efficient and reliable in its action. Waste of lubricant is avoided and the highest economy in lubrication is had.

While I have shown and described one construction in which the invention may be embodied, it is to be understood that the construction shown has been selected merely for the purposes of illustration or example and that various changes in the size, shape and arrangement of the parts may be made without departing from the spirit of the invention and the scope of the subjoined claims.

The invention claimed is:

1. A loose pulley lubricator comprising a body having a delivery fitting adapted for connection with the hub of a pulley, a container for lubricant carried by said body, a hollow valve member within the container and connected to and communicating with said discharge fitting, said valve member having an opening leading to the interior of the container and a cap threadedly interconnected with the valve member and cooperable with said opening to regulate the flow of lubricant from the container through the opening into the member in combination with a wick disposed in said hollow valve member and leading to the bearing to be lubricated.

2. A lubricator comprising a container for lubricant, means for delivering lubricant from the container to a bearing, and including a tube having one end communicating with the bearing and its other end communicating with the container, and a cap threaded on said last-named end of the tube and having ports cooperable with the tube for regulating the flow of lubricant from the container into the tube, said cap having means for deflecting oil into the interior of the tube.

3. A loose pulley lubricator comprising a body adapted to be connected to the pulley and having an opening adapted to communicate with the parts to be lubricated, a container for the lubricant carried by said body, a valve tube having one end connected to the body and communicating with its opening, said valve tube extending into the container, and a ported cap threadedly interconnected with the end of the tube disposed in the container, the end of said tube associated with said cap being reduced and being cooperable with the cap whereby to control the rate of flow of lubricant from the lubricator.

4. A loose pulley lubricator comprising a body adapted to be connected to the pulley and having an opening adapted to communicate with the parts to be lubricated, a container for the lubricant carried by said body, a valve tube having one end connected to the body and communicating with its opening, said valve tube extending into the container, and a ported cap threadedly interconnected with the end of the tube disposed in the container, the end of the tube associated with the cap being reduced and beveled and said cap having a beveled wall cooperable with said beveled end whereby the rate of feed of the lubricant is controlled.

5. A loose pulley lubricator comprising a body adapted to be connected to the pulley and having an opening adapted to communicate with the parts to be lubricated, a container for the lubricant carried by said body, a valve tube having one end connected to the body and communicating with its opening, said valve tube extending into the container, and a ported cap threadedly interconnected with the end of the tube disposed in the container, said cap having a beveled wall opposed to and cooperable with the adjacent end of the tube to provide for a regulated flow of the lubricant through the ports of the cap and into the interior of the tube.

6. A loose pulley lubricator comprising a container for the lubricant, a tube connected to and extending into the container and having one end projecting therefrom and adapted to communicate with the bearing to be lubricated, said tube having an opening within the container whereby lubricant in the container may flow into the tube, a flow regulating member threadedly interconnected with the tube and cooperable with the opening to vary the rate of flow of the lubricant from the container into the tube, and a wick positioned in the tube and extending to the bearing to be lubricated and acting to counteract the effect of centrifugal force and insure travel of the lubricant from the opening of the tube to the bearing to be lubricated.

CARL L. DAUN.